(12) United States Patent
Choi

(10) Patent No.: US 7,975,844 B2
(45) Date of Patent: Jul. 12, 2011

(54) OPTICAL MEDIA DISC CASE

(75) Inventor: King Yeung Choi, Hong Kong (HK)

(73) Assignee: Encore Holdings Ltd, Nassau (BS)

( * ) Notice: Subject to any disclaimer, the term of this patent is extended or adjusted under 35 U.S.C. 154(b) by 227 days.

(21) Appl. No.: 12/034,625

(22) Filed: Feb. 20, 2008

(65) Prior Publication Data
US 2009/0205984 A1   Aug. 20, 2009

(51) Int. Cl.
B65D 85/57  (2006.01)
(52) U.S. Cl. .................. 206/308.1; 206/310
(58) Field of Classification Search .......... 206/308.1, 206/310, 311, 307, 232, 312, 472, 459.5
See application file for complete search history.

(56) References Cited

U.S. PATENT DOCUMENTS

| | | | | |
|---|---|---|---|---|
| 2,873,877 A * | 2/1959 | Morin | | 220/367.1 |
| 4,140,828 A * | 2/1979 | Copping | | 428/167 |
| 4,784,264 A * | 11/1988 | Sykes | | 206/387.13 |
| 5,799,782 A * | 9/1998 | Gelardi | | 206/308.1 |
| D420,240 S * | 2/2000 | Sorenson et al. | | D6/632 |
| 6,029,848 A | 2/2000 | Cha et al. | | |
| 6,092,652 A | 7/2000 | Evans | | |
| 6,206,186 B1 * | 3/2001 | Cerda-Vilaplana et al. | | 206/308.1 |
| 6,398,022 B1 * | 6/2002 | Mou et al. | | 206/308.1 |
| 2002/0033348 A1 | 3/2002 | Flores, Jr. | | |
| 2002/0056654 A1 | 5/2002 | Carman et al. | | |
| 2004/0144662 A1 * | 7/2004 | Bolognia et al. | | 206/308.1 |
| 2005/0269223 A1 * | 12/2005 | Wawrzynowski | | 206/308.1 |
| 2007/0215498 A1 * | 9/2007 | Barnette et al. | | 206/308.1 |
| 2007/0235356 A1 | 10/2007 | Durham et al. | | |
| 2007/0267305 A1 * | 11/2007 | Johnston et al. | | 206/308.1 |
| 2008/0041743 A1 * | 2/2008 | Lau | | 206/310 |

FOREIGN PATENT DOCUMENTS

| | | |
|---|---|---|
| EP | 0 576 256 | 12/1993 |
| EP | 1 918 935 | 5/2008 |
| WO | WO 99/59153 | 11/1999 |

* cited by examiner

*Primary Examiner* — David T Fidei
(74) *Attorney, Agent, or Firm* — Kauth, Pomeroy, Peck & Bailey LLP

(57) ABSTRACT

A one-piece, injection-molded case (10) for containing an optical media disc (85), the case (10) comprising: a front cover (20): a back cover (40); a spine (30) to pivotally connect the front and back covers (20, 40); a flexible, polymeric sleeve (70) to wrap around an external surface of the front and back covers (20, 40) and spine (30); wherein the front and back covers (20, 40) have voids defining cut-out portions (50, 60) to reduce the weight of the case (10).

6 Claims, 4 Drawing Sheets

OPTICAL MEDIA DISC CASE

TECHNICAL FIELD

The invention concerns a case for an optical media disc that has relatively less weight than conventional optical media disc cases.

BACKGROUND OF THE INVENTION

Shipping/postal fees or courier charges for items such as DVDs are typically calculated based on the following factors: the distance from source to destination, location of the destination and weight of the item to be sent.

There are concerns that DVD cases are not environmentally friendly because they are made from plastics material which is not biodegradable.

It is a desire to reduce the weight of the DVD cases in order to reduce the cost of shipping. It is another desire to reduce the amount of plastics material required for DVD cases to reduce manufacturing costs and minimize environmental impact.

SUMMARY OF THE INVENTION

In a first preferred aspect, there is provided a one-piece, injection-molded case for containing an optical media disc, the case comprising:
 a front cover;
 a back cover;
 a spine to pivotally connect the front and back covers;
 a flexible, polymeric sleeve to wrap around an external surface of the front and back covers and spine;
 wherein the front and back covers have voids defining cut-out portions to reduce the weight of the case.

The front cover may be coupled to the spine via a first living hinge and the back cover is coupled to the spine via a second living hinge, and wherein when the case is in a closed configuration, has upper and lower sidewalls, a spine sidewall, and a closure sidewall.

The sleeve may be bonded to an edge of the closure sidewall on an outer surface of the front cover and to an edge of the closure sidewall on an outer surface of the back cover, the sleeve covering major portions of the front cover, the back cover, and the spine.

The cut-out portions may be covered by a printed paper insert that is inserted between the sleeve and the covers.

The case may further comprise booklet clips on an inner surface of the front cover, the clips for holding an informational booklet to conceal the cut-out portions of the front cover.

The case may further comprise a disc mounting structure to enable the mounting of the optical media disc, the disc mounting structure provided on an inner surface of the back cover.

When the case is in an open configuration, the cut-out portions of the front cover may be covered by the informational booklet and the cut-out portions of the back cover may be covered by the optical media disc mounted in the disc mounting structure so that the cut-out portions are concealed.

The disc mounting structure may comprise a disc mounting hub and a disc mounting platform, the cut-out portions of the back cover located in an area of the back cover defined within the circumferential edge of the disc mounting platform, and the disc mounting hub may be positioned at the centre of the back cover and connected to the back cover by supporting members extending between the cut-out portions of the back cover.

The cut-out portions may be positioned radially around the centre of the front and back covers.

There may be six cut-out portions defined in the front cover in a circular arrangement and six cut-out portions defined in the back cover in a circular arrangement.

The total area of the cut-out portions of the front cover may be greater than the total area of the cut-out portions of the back cover.

In a second aspect, there is provided a method for manufacturing the case as described, the method comprising:
 an injection molding operation to inject molten plastic into a mold of the case at high pressure; and
 stamping voids in the front and back covers to define the cut-out portions after the case has cooled.

A stamp with a die in the shape of the cut-out portions may be used for the stamping.

BRIEF DESCRIPTION OF THE DRAWINGS

An example of the invention will now be described with reference to the accompanying drawings, in which.

DETAILED DESCRIPTION OF THE DRAWINGS

Figure 1:
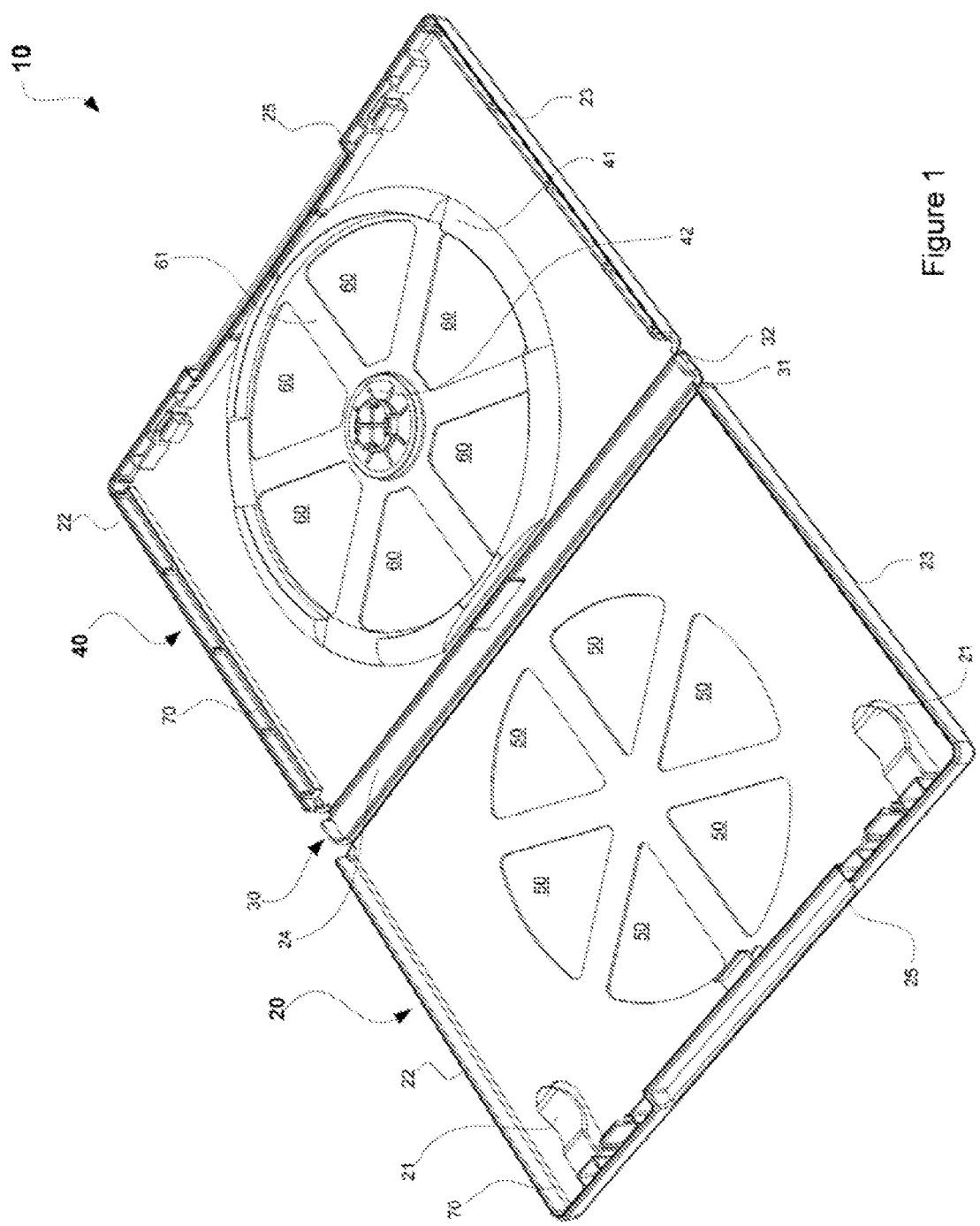
FIG. 1 is a perspective view of an inner surface of a case in an open configuration in accordance with a preferred embodiment of the present invention.
Figure 2:
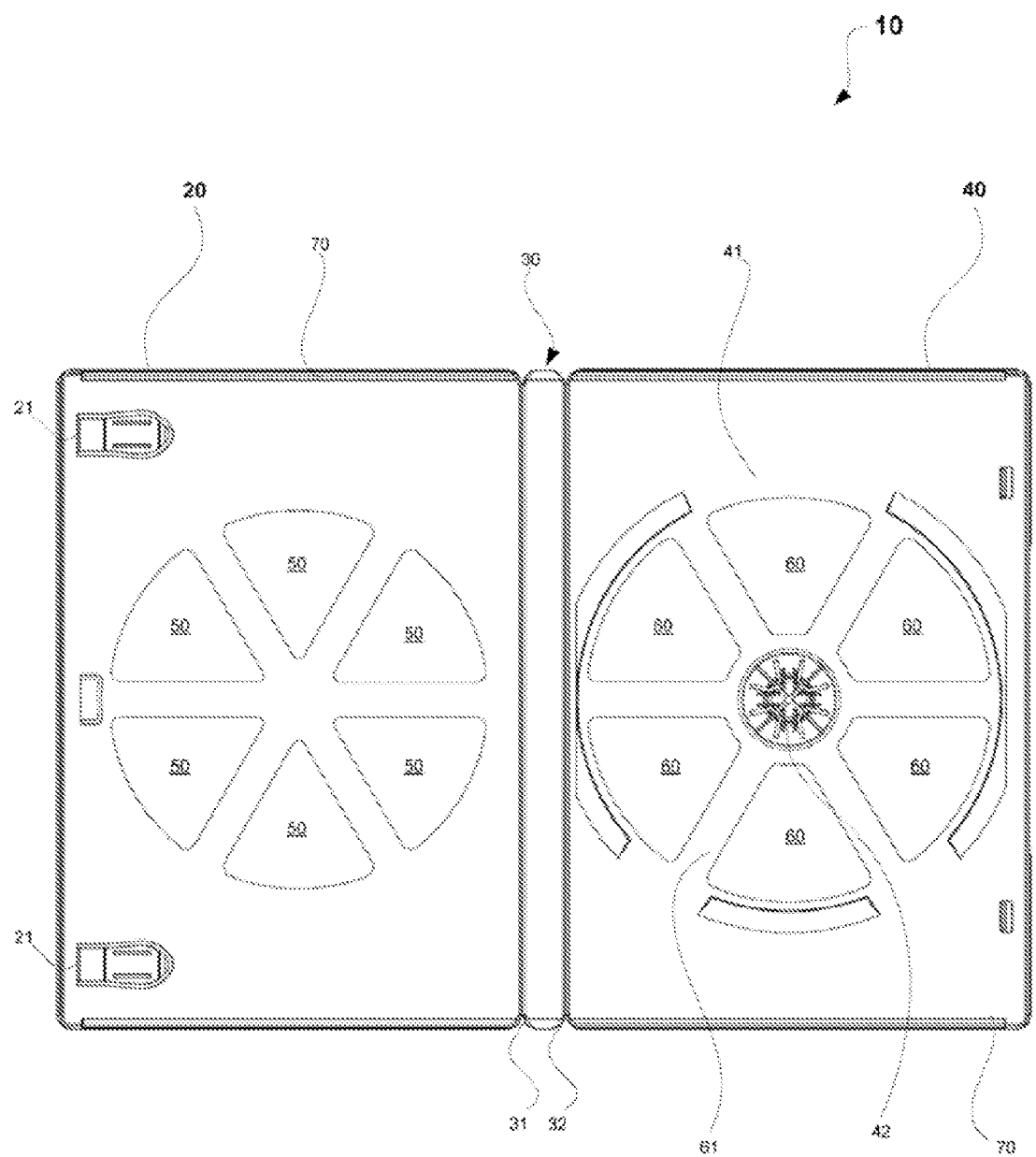
FIG. 2 is a front view of an outer surface of the case of FIG. 1.
Figure 3:
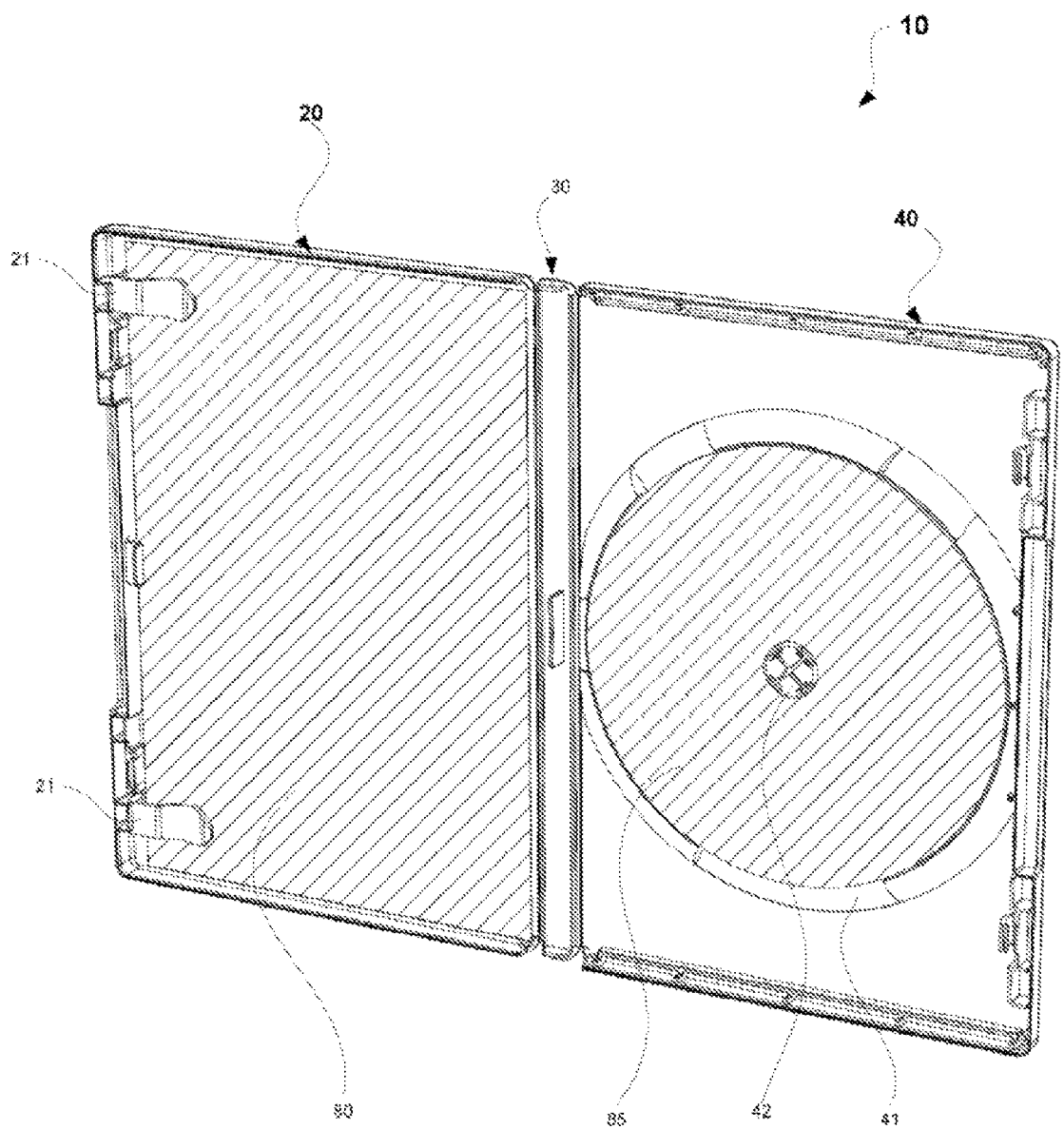
FIG. 3 is a perspective view of the inner surface of the case of FIG. 1 showing an informational booklet and a DVD that are hiding cut-out portions made in the case.
Figure 4:
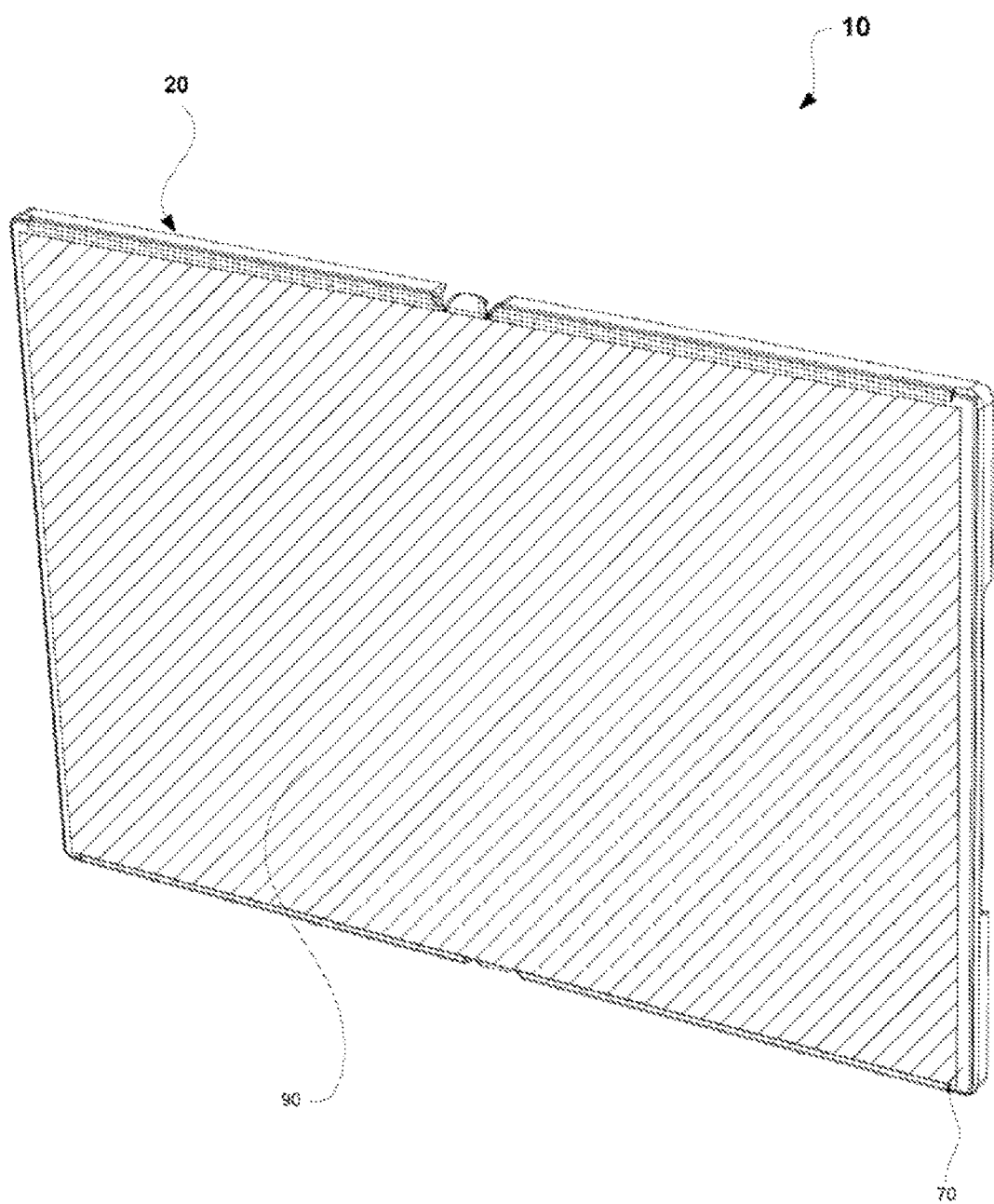
FIG. 4 is a perspective view of the outer surface of a case in a closed configuration in accordance with a preferred embodiment of the present invention showing a printed paper insert inserted between a polymeric sleeve and covers of the case.

Referring to the drawings, a one-piece, injection-molded case 10 for containing an optical media disc such as a DVD 85 is provided. The case 10 generally comprises: a front cover 20, a back cover 40, a spine 30 and a flexible, polymeric sleeve 70. The spine 30 pivotally connects the front and back covers 20, 40. The flexible, polymeric sleeve 70 wraps around an external surface of the front and back covers 20, 40 and spine 30. The front and back covers 20, 40 have voids defining cut-out portions 50, 60 to reduce the weight of the case 10.

Preferably, the cut-out portions 50, 60 are such that they are still able to protect the DVD 85 from damage caused by an external force, and also maintain some rigidity for the entire case 10. In other words, the size, location and quantity of cut-out portions 50, 60 ensure that the rigidity of the case 10 is maintained. In one exemplary configuration, the cut-out portions 50, 60 are positioned radially around the centre of the front and back covers 20, 40. There are six cut-out portions 50 defined in the front cover 20 in a circular arrangement and six cut-out portions 60 defined in the back cover 40 in a circular arrangement. In alternate embodiments, the total area of the cut-out portions 50 of the front cover 20 is greater than the total area of the cut-out portions 60 of the back cover 40. This is because the front cover 20 does not carry the DVD 85 unlike the back cover 40.

The front cover 20 is coupled to the spine 30 via a first living hinge 31 and the back cover 40 is coupled to the spine 30 via a second living hinge 32. When the case 10 is in a closed configuration, the case 10 has upper and lower sidewalls 22, 23, a spine sidewall 24, and a closure sidewall 25.

The sleeve 70 is bonded to an edge of the closure sidewall 25 on an outer surface of the front cover 20 and to an edge of the closure sidewall 25 on an outer surface of the back cover 40. The sleeve 25 covers major portions of the front cover 20, the back cover 40, and the spine 30.

The cutout portions 50, 60 are covered by a printed paper insert 90 that is inserted between the sleeve 70 and the covers 20, 40. The printed paper insert 90 conceals the cut-out portions 50, 60 when the outer surface of the case 10 is visible, for example, when the case 10 is in an open or closed configuration.

Booklet clips 21 on an inner surface of the front cover 20 are provide. The clips 21 hold an informational booklet 80. The sleeve 70, printed paper insert 90 or informational booklet 80 protects the DVD 85 from damage caused by scratching.

A disc mounting structure 41, 42 is provided on an inner surface of the back cover 40. When the case 10 is in an open configuration, the cut-out portions 50 of the front cover 20 are covered by the informational booklet 80 and the cut-out portions 60 of the back cover 40 are covered by the DVD 85 mounted in the disc mounting structure 41, 42. This is so that the cut-out portions 50, 60 are concealed and are not visually apparent to the consumer when the inner surface of the case 10 is visible, for example, when the case 10 is in an open configuration.

The disc mounting structure comprises a disc mounting hub 42 and a disc mounting platform 41. The cut-out portions 60 of the back cover 40 are located in an area of the back cover 40 defined within the circumferential edge of the disc mounting platform 41. Once the DVD 85 is mounted in the disc mounting structure, it is able to hide or conceal the cut-out portions 60 of the back cover 40. The disc mounting hub 42 is positioned at the centre of the back cover 40 and connected to the back cover 40 by supporting members 61 extending between the cutout portions 60 of the back cover 40. However, the position of the disc mounting hub 42 is not critical.

A method for manufacturing the case 10 is provided. Since the case 10 is a one-piece, injection-molded case 10, a typical injection molding operation occurs. Molten plastic is injected at high pressure into a mold for the case 10. The mold is the inverse of the final shape of the case 10. After the molding operation, the mold is opened and the case 10 is removed and allowed to cool. After the case 10 has cooled and is sufficiently rigid, a stamping operation occurs to define the cut-out portions 50, 60 in the case 10. The case 10 is stamped by a die having the shape of the cut-out portions 50, 60. A stamper stamps the die onto the case 10 which creates the voids in the covers 20, 40 corresponding to the cut-out portions 50, 60. It is possible there may be more than one die and one stamper used, for example, one for the front cover 20 and one for the back cover 40. The plastic pieces of the cut-out portions 50, 60 that have been discharged from the case 10 by the stamping operation are collected and re-used for the injection molding operation again. This minimizes wastage of plastics material which reduces cost and environmental impact.

Although the cut-out portions 50, 60 are described and illustrated as arcuate members, other shapes and sizes are envisaged. Although the cut-out portions 50, 60 are described and illustrated as positioned around the centre of the covers 20, 40, they may be located in other positions on the covers 20, 40. Although six cut-out portions are illustrated on each cover 20, 40, various quantities are possible.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

What is claimed:

1. A one-piece, injection-molded case for containing an optical media disc, the case comprising:
    a front cover; a back cover; a spine to pivotally connect the front and back covers; and
    a flexible, polymeric sleeve to wrap around an external surface of the front and back covers and spine;
    a plurality of cut-out portions in the front cover and back cover arranged radially around a point of the front cover or back cover;
    a pair of booklet clips on an inner surface of the front cover;
    a disc mounting structure on the inner surface of the back cover;
    the front cover is coupled to the spine via a first living hinge and the back cover is coupled to the spine via a second living hinge, and when the case is in a closed configuration, has upper and lower sidewalls, a spine sidewall and a closure sidewall;
    wherein the flexible, polymeric sleeve is configured so that the cut-out portions in the exterior of the covers are concealed when a printed paper insert is inserted between the sleeve and the covers;
    wherein the booklet clips are configured so that the cut-out portions in the interior of the front cover are concealed when an information booklet is held by the clips;
    wherein the cut-out portions in the interior of the back cover are concealed when an optical media disc is mounted in the disc mounting structure.

2. The case according to claim 1, wherein the sleeve is bonded to an edge of the closure sidewall on an outer surface of the front cover and to an edge of the closure sidewall on an outer surface of the back cover, the sleeve covering major portions of the front cover, the back cover, and the spine.

3. The case according to claim 1, wherein the disc mounting structure comprises a disc mounting hub and a disc mounting platform, the cut-out portions of the back cover located in an area of the back cover defined within the circumferential edge of the disc mounting platform, and the disc mounting hub is positioned at the centre of the back cover and connected to the back cover by supporting members extending between the cut-out portions of the back cover.

4. The case according to claim 3, wherein there are at least three cut-out portions defined in the front cover in a circular arrangement or at least three cut-out portions defined in the back cover in a circular arrangement.

5. The case according to claim 4, wherein there are six cut-out portions defined in the front cover in a circular arrangement or six cut-out portions defined in the back cover in a circular arrangement.

6. The case according to claim 1, wherein the total area of the cut-out portions of the front cover is greater than the total area of the cut-out portions of the back cover.

* * * * *